US012297549B2

(12) United States Patent
Pmsvvsv

(10) Patent No.: US 12,297,549 B2
(45) Date of Patent: May 13, 2025

(54) GRID SUPPORTING ELECTROLYZER

(71) Applicant: Bloom Energy Corporation, San Jose, CA (US)

(72) Inventor: Prasad Pmsvvsv, San Jose, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 0 days.

(21) Appl. No.: 18/162,060

(22) Filed: Jan. 31, 2023

(65) Prior Publication Data
US 2023/0243055 A1 Aug. 3, 2023

Related U.S. Application Data

(60) Provisional application No. 63/305,212, filed on Jan. 31, 2022.

(51) Int. Cl.
C25B 15/02 (2021.01)
C25B 1/04 (2021.01)
C25B 9/65 (2021.01)
H02J 3/38 (2006.01)

(52) U.S. Cl.
CPC ............ *C25B 15/02* (2013.01); *C25B 1/04* (2013.01); *C25B 9/65* (2021.01); *H02J 3/381* (2013.01); *H02J 2300/20* (2020.01)

(58) Field of Classification Search
CPC ........................................ C25B 1/04–1/044
See application file for complete search history.

(56) References Cited

U.S. PATENT DOCUMENTS

| 2005/0145505 | A1  | 7/2005  | Fairlie et al. |
|---|---|---|---|
| 2011/0008696 | A1  | 1/2011  | Ballantine |
| 2013/0093194 | A1* | 4/2013  | Barbachano ............ F03D 9/19 290/55 |
| 2013/0317959 | A1* | 11/2013 | Joos ...................... C25B 9/70 205/637 |
| 2014/0309801 | A1  | 10/2014 | Markowz et al. |

(Continued)

FOREIGN PATENT DOCUMENTS

| CN | 108599190 A | 9/2018 |
|---|---|---|
| DE | 102012203334 A1 | 9/2013 |

OTHER PUBLICATIONS

Veerakumar et al, Fast Active Power-Frequency Support Methods by Large Scale Electrolyzers for Multi-Energy Systems, 2020 IEEE PES Innovative Smart Grid Tehcnologies Europe (ISGT-Europe), Nov. 2020, pp. 151-155 (Year: 2020).*

(Continued)

*Primary Examiner* — Harry D Wilkins, III
(74) *Attorney, Agent, or Firm* — THE MARBURY LAW GROUP PLLC

(57) ABSTRACT

Systems, devices, methods, and instructions for operating an electrolyzer, including setting a nominal frequency or a nominal voltage of a connected electrical power system, the electrolyzer being configured to deliver a rated production level at the nominal frequency or the nominal voltage, setting an adjustable dead band at or near the nominal frequency or the nominal voltage, and reducing hydrogen generation and reducing power consumption if the frequency drops below the nominal frequency or if the voltage drops below the nominal voltage.

20 Claims, 6 Drawing Sheets

(56) References Cited

U.S. PATENT DOCUMENTS

2014/0327304 A1 11/2014 Markowz et al.
2015/0105923 A1 4/2015 Beekmann

OTHER PUBLICATIONS

Guha et al, Bulk Grid Frequency Support Using Electrolyzers, 2020 IEEE Industry Applications Society Annual Meeting, Feb. 2021, pp. 1-5 (Year: 2021).*

Ehl et al, Faraday's Electrochemical Laws and the Determination of Equivalent Weights, Journal of Chemical Education, vol. 31, No. 5, May 1954, pp. 226-232 (Year: 1954).*

Kim et al, Droop Control Strategy of Utility-Scale Photovoltaic Systems Using Adaptive Dead Band, Applied Sciences, vol. 10, No. 22, Nov. 2020, 8032, pp. 1-17 (Year: 2020).*

Extended European Search Report and Written Opinion issued Jun. 15, 2023 in corresponding European Patent Application No. 23154149.1.

International Search Report and Written Opinion mailed May 4, 2023 in corresponding PCT Application No. PCT/IB2023/050845.

EPO Office Communication Pursuant to Rule 114(2) EPC and Third Party Observations for European Patent Application No. 23154149, mailed on Jan. 7, 2025, 27 pages.

* cited by examiner

100

200

300

400

500

600

GRID SUPPORTING ELECTROLYZER

FIELD OF THE INVENTION

The embodiments of the present invention generally relate to a grid supporting electrolyzer and methods of operating the same.

BACKGROUND OF THE INVENTION

Electrolyzers are devices that consume electricity in order to produce hydrogen by splitting water molecules or other hydrocarbon fuel molecules. The input power source to the electrolyzer can be either a main grid (i.e., a utility grid), a microgrid, or a combination thereof. In general, the microgrid includes one or more distributed electrical resources (DERs), such as solar, wind, geothermal, hydro, storage, conventional, and the like. The main grid also can include several distributed power resources.

The electrical power system (EPS), whether it is a main grid or a microgrid, goes through various fluctuations caused by disruption in the balance between total generation power and total load power on the EPS network. Such fluctuations are increasingly present because of the intermittent nature of the power generated by renewable energy sources connected in the DERs. When the amount of power generation on the network is greater than the total load power, then the voltage and/or frequency of the power system increases. Similarly, when the total amount of load power is greater than the power generation, then voltage and/or frequency of the power system is reduced.

If action is not taken in response to these voltage and frequency fluctuations, interruption to the grid can occur. For example, the fluctuations can result in the total collapse of the grid, and this is true for both microgrid and utility grid operations. Ideally, one expects power generation resources to respond immediately to meet the total load demand on network, but in the practical world that instantaneous response is not possible as many conventional generation systems have a much slower response as compared to variations in loads. Accordingly, under generation of power continues to pose a real threat to EPS networks.

Until now, different options available for network operators are load shedding or using storage modules. However, the addition of a storage module comes with additional cost, footprint, and higher control complexity. In the case of a utility grid network, though it is not ideal, load shedding is one option to control the balance between total generation on network and total load on the network. Extending storage solutions to the main grid as well can be considered, but that also comes with much higher costs.

SUMMARY OF THE INVENTION

Accordingly, the embodiments of the present invention are directed to a grid supporting electrolyzer that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the grid supporting electrolyzer includes systems, devices, methods, and instructions for operating an electrolyzer, comprising setting $f_0$ as a nominal frequency of a connected electrical power system, the electrolyzer being configured to deliver rated production level $P_0$ at $f_0$, setting an adjustable dead band ($f_1$-$f_0$) at or near nominal frequency $f_0$, and reducing hydrogen generation and reducing power consumption once the frequency drops below the frequency $f_1$ level until it reaches zero hydrogen production at frequency $f_2$.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
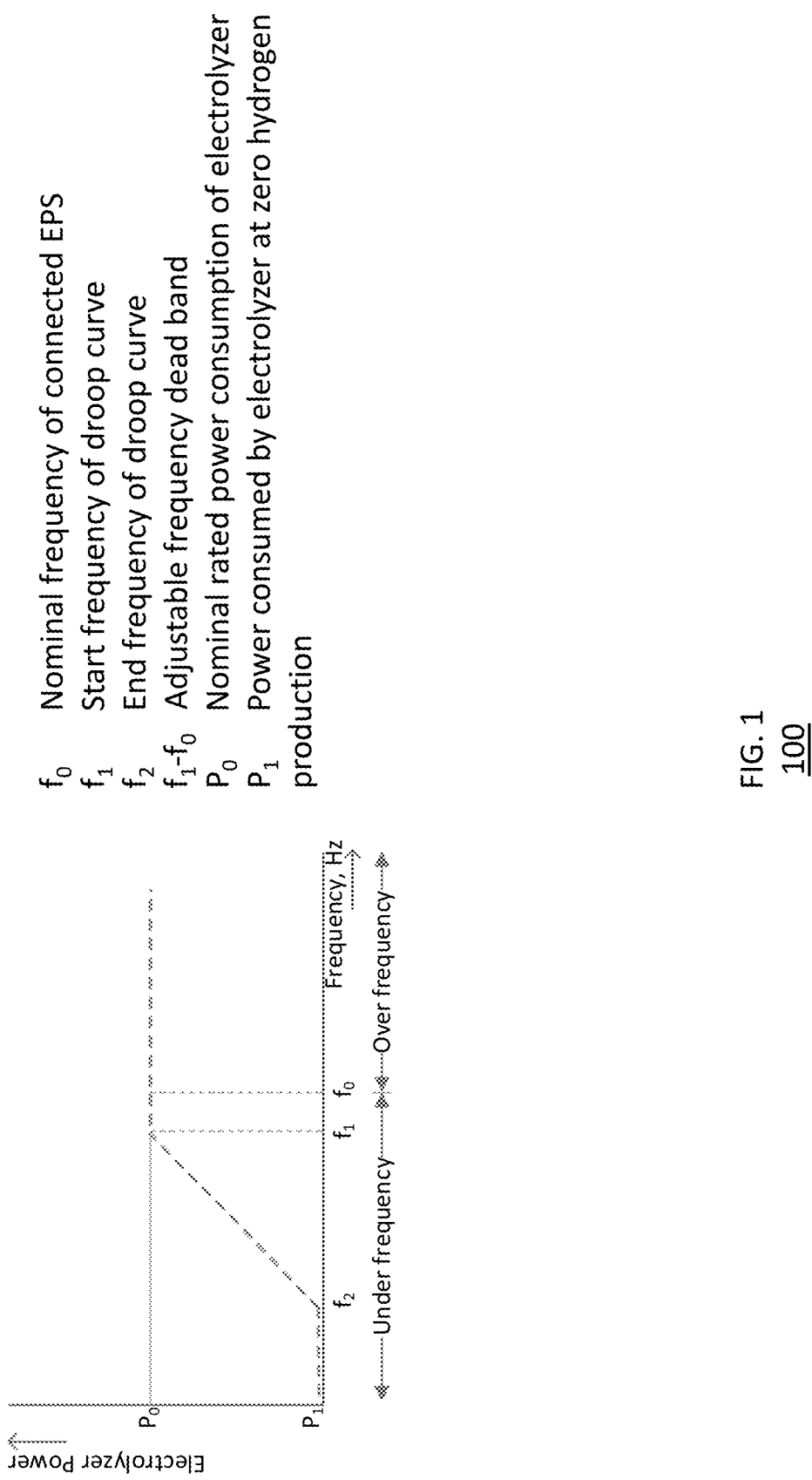
FIG. 1 graphically illustrates frequency droop control of an electrolyzer system according to an example embodiment of the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Values and ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X or +/−5% X. It will be further understood that the endpoints of each of the ranges are significant both in relation to the other endpoint, and independently of the other endpoint. The values and ranges provide examples, but the embodiments of the invention are not so limited.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The embodiments of the present invention generally relate to adjusting and controlling the rate of hydrogen production in electrolyzer plants based on the conditions of input power sources in order to support stability of the input network. The input network can be either a main grid (i.e., a utility grid), a microgrid, or a combination thereof.

The embodiments propose to adjust the rate of hydrogen production based on EPS network conditions by using voltage and frequency droop based control. These control techniques are used in distributed generation and often mandatory functions to incorporate to support the connected grid. However, these functions are generally available in energy generation products and battery chargers. The embodiments introduce these functions to electrolyzers to support the connected EPS network. The voltage and frequency droop based control, and systems, devices, methods, and instructions therefor utilize one or more controllers of the electrolyzer system. The control algorithms are generally implemented in a digital controller such as microcontroller, digital signal processor (DSP), field programmable gate array (FPGA), and/or industrial computer.

When the amount of power generation goes above the amount of load on the electrical power system network, the frequency and/or voltage of the electrical power system goes above nominal frequency and/or nominal voltage levels. Similarly, frequency and/or voltage of the electrical power system goes below nominal values when power consumption on the network is more than power generation. Typically, the nominal frequency of the electrical power system is 60 Hz or 50 Hz depending upon the geographical location. The nominal voltage can be anywhere between a few hundreds of volts to few thousands of volts, so it is common to reference voltage in percentage of its nominal voltage.

FIG. 1 graphically illustrates frequency droop control of an electrolyzer system according to an example embodiment of the present invention. The graph 100 of FIG. 1 shows a droop curve of the electrolyzer system with dead band ($f_1$-$f_0$) at or near nominal frequency $f_0$.

As illustrated in FIG. 1, $f_0$ is the nominal frequency of the connected electrical power system (i.e., typically at or near 60 Hz, 50 Hz). At nominal frequency $f_0$, the electrolyzer system is configured to deliver rated production level $P_0$. An adjustable dead band ($f_1$-$f_0$) at or near nominal frequency $f_0$ is used to prevent the electrolyzer from responding to small fluctuations in frequency and thus improve stability of the network.

The electrolyzer starts reducing its hydrogen generation, and thus reducing power consumption from the network once frequency drops below $f_1$ level until it reaches zero hydrogen production at frequency $f_2$. When the frequency increases, the electrolyzer ramps up production according to the droop curve (e.g., linear or non-linear).

As will be readily understood, the power draw of the electrolyzer plant can be minimized (but not be exactly zero kW) when the hydrogen production drops to a zero level because there are balance of plant (BOP) loads at the site that must be maintained. The electrolyzer system can be configured to completely turn off at some frequency lower than $f_2$ as an optional feature.

The dead band can be set as low as zero which makes $f_1$=$f_0$. Alternatively, the dead band ($f_1$-$f_0$) can be configured to be i) a pre-set fixed value; ii) adjusted manually; iii) adjusted automatically based on schedule, environmental conditions; and/or iv) periodically or iteratively adjusted based on grid conditions using one or more algorithms, artificial intelligence (AI) and/or machine learning (ML).

FIGS. 2A-2D graphically illustrate frequency droop control of an electrolyzer system according to other example embodiments of the present invention. The graphs 200A, 200B, 200C, 200D illustrate differing slope curves according to various embodiments.

Figure 2:
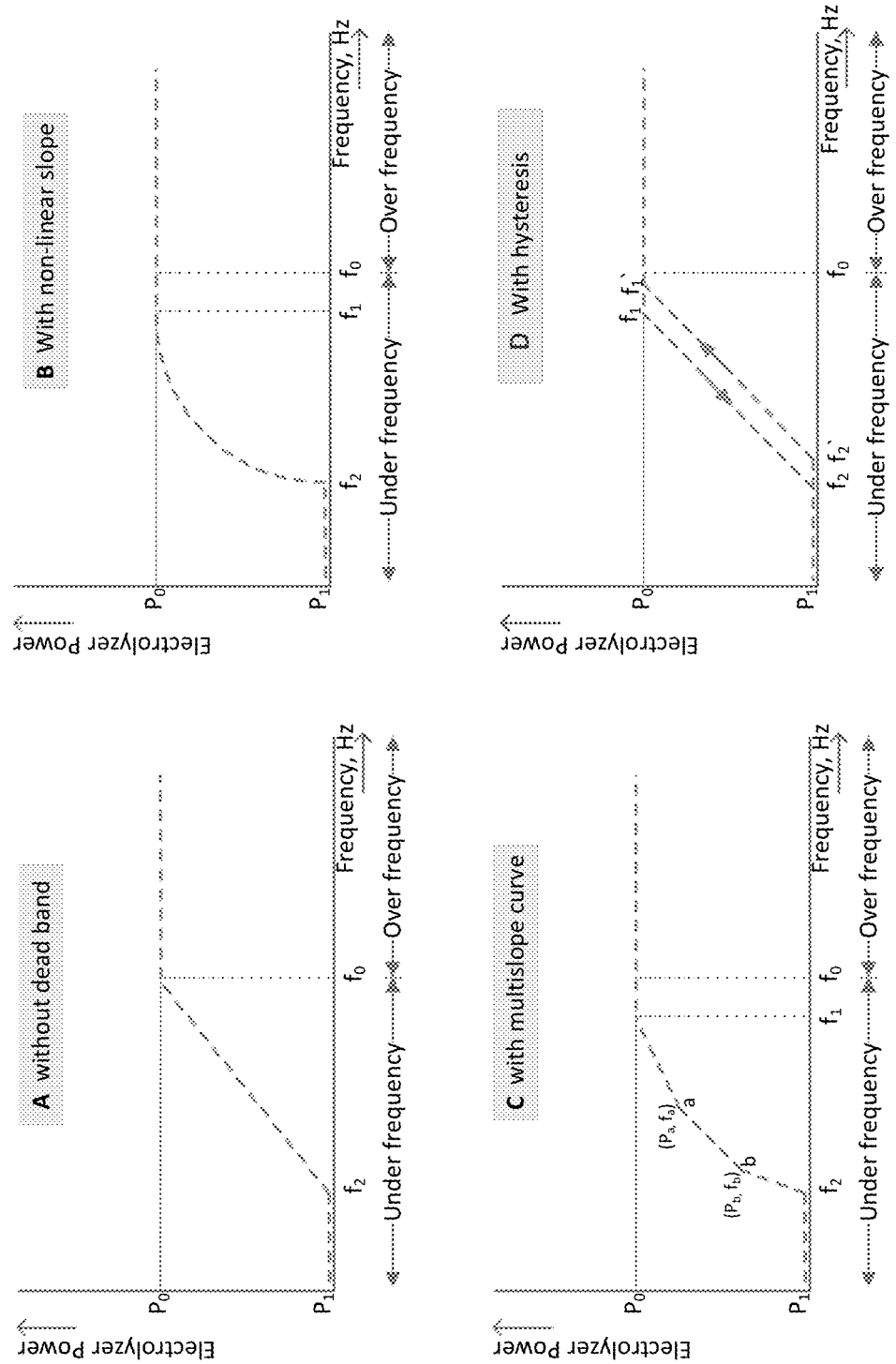
FIGS. 2A-2D graphically illustrate frequency droop control of an electrolyzer system according to other example embodiments of the present invention.

As shown in FIG. 2A, the dead band can be set to as low as zero Hz. The slope of the droop curve between $f_1$ and $f_2$ can be linear as shown in FIG. 1 (or between $f_0$ and $f_2$ of FIG. 2A), or non-linear as shown in FIG. 2B. Alternatively, or additionally, the slope of the droop curve between $f_1$ and $f_2$ can have multiple slopes (e.g., linear and/or non-linear) as shown in FIG. 2C. In yet another alternative, the slope of the droop curve between $f_1$ and $f_2$ can have hysteresis as shown in FIG. 2D. The width of hysteresis ($f_1$-$f_1'$ and $f_2$-$f_2'$) and slopes between $f_1$ and $f_2$ as well as between $f_1'$ and $f_2'$ are adjustable.

In some configurations, the electrolyzer operates below its maximum possible production level for various reasons such as optimizing life expectancy, increasing reliability, etc. Additionally, or alternatively, the electrolyzers can be configured to support overproduction (overload) for a short period of time. In such as cases, the additional production can be achieved during over frequency grid scenarios. Over frequency on the electrical power system network indicates there is excess generation available which can be consumed before generators react and reduce the generation level. The electrolyzers can be configured to consume the excess power by increasing their hydrogen production level beyond the nominal rating for short period of time while the generators begin a process of reducing power. The consumption of excess power reduces excess generation available on the network and thus mitigates over frequency levels.

Figure 3:
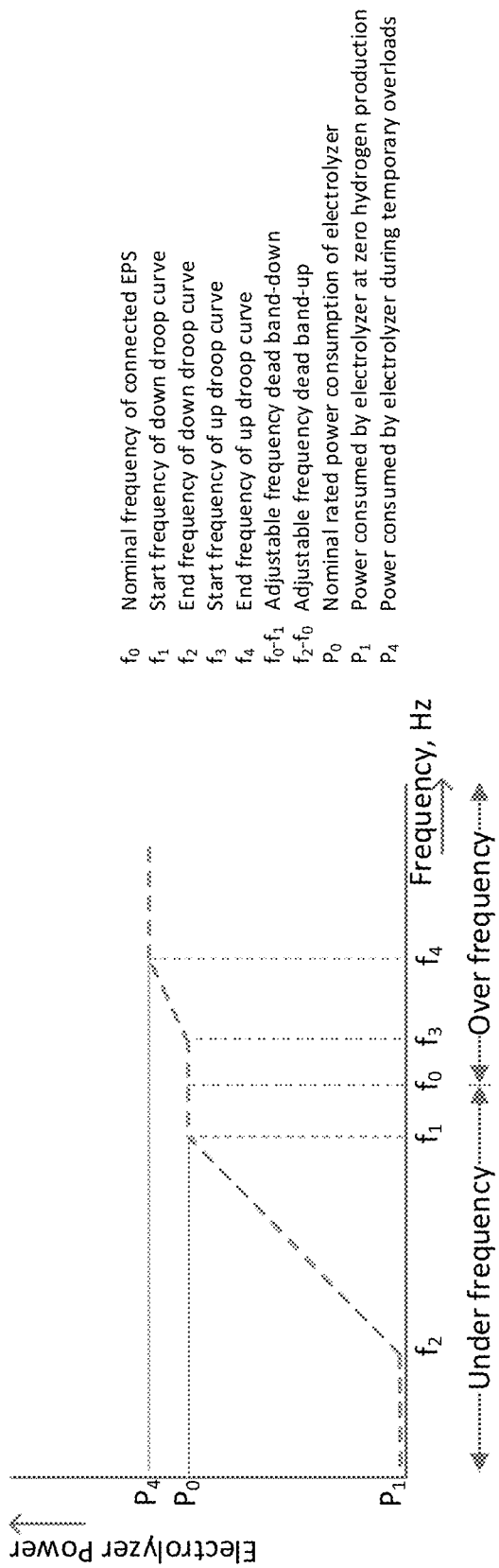
FIG. 3 graphically illustrates a frequency droop characteristic of an electrolyzer system with temporary overload according to an example embodiment of the present invention.

FIG. 3 graphically illustrates a frequency droop characteristic of an electrolyzer system with temporary overload according to an example embodiment of the present invention. The graph 300 illustrates over production level $P_4$ during temporary overloads.

At nominal frequency $f_0$, the electrolyzer system is configured to deliver rated production level $P_0$. An adjustable dead band down ($f_1$-$f_0$) at or near nominal frequency $f_0$ is used to prevent the electrolyzer from responding to small downward fluctuations in frequency and thus improve stability of the network. An adjustable dead band up ($f_0$-$f_3$) at or near nominal frequency $f_0$ is used to prevent the electrolyzer from responding to small upward fluctuations in frequency and thus improve stability of the network.

The electrolyzer starts reducing its hydrogen generation, and thus reducing power consumption from the network once frequency drops below $f_1$ level until it reaches zero hydrogen production at frequency $f_2$. When the frequency increases, the electrolyzer ramps up production according to the droop curve. The electrolyzer starts increasing its hydrogen generation, and thus increasing power consumption from the network once the frequency exceeds $f_3$ level until it reaches overload hydrogen production at frequency $f_4$.

Figure 4:
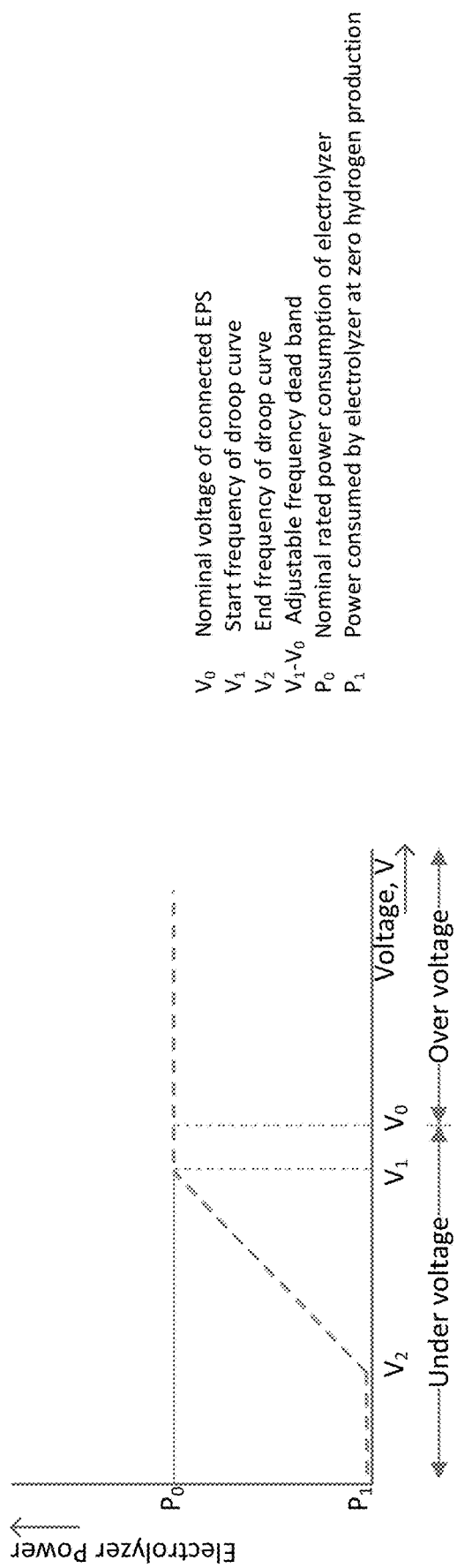
FIG. 4 graphically illustrates voltage droop control of an electrolyzer system according to an example embodiment of the present invention.

FIG. 4 graphically illustrates voltage droop control of an electrolyzer system with active power according to an example embodiment of the present invention. The graph

400 of FIG. 4 shows a droop curve of the electrolyzer system with dead band ($V_1$-$V_0$) at or near nominal voltage $V_0$.

As illustrated in FIG. 4, $V_0$ is the nominal voltage of the connected electrical power system. At nominal voltage $V_0$, the electrolyzer system is configured to deliver rated production level $P_0$. An adjustable dead band ($V_1$-$V_0$) at or near nominal voltage $V_0$ is used to prevent the electrolyzer from responding to small fluctuations in voltage and thus improve stability of the network.

The electrolyzer starts reducing its hydrogen generation, and thus reducing power consumption from network once voltage drops below $V_1$ level until it reaches zero hydrogen production at voltage $V_2$. When the voltage increases, the electrolyzer ramps up production according to the droop curve.

As will be readily understood, the power draw of the electrolyzer plant can be minimized (but not be exactly zero kW) when the hydrogen production drops to a zero level because there are balance of plant (BOP) loads at the site that must be maintained. The electrolyzer system can be configured to completely turn off at some voltage lower than $V_2$ as an optional feature.

The dead band can be set as low as zero which makes $V_1$=$V_0$. Alternatively, the dead band ($V_1$-$V_0$) can be configured to be i) a pre-set fixed value; ii) adjusted manually; iii) adjusted automatically based on schedule, environmental conditions; and/or iv) periodically or iteratively adjusted based on grid conditions using one or more algorithms, artificial intelligence (AI), and/or or machine learning (ML).

The operating principle is similar to frequency droop except that the affecting parameter is voltage. Unlike over/under frequency where frequency of electrical power system is directly related to active power imbalance, the over/under voltage condition on electrical power system can be a result of either reactive power imbalance, active power imbalance, or a combination thereof with reactive power imbalance being the primary cause. However, electrolyzers can adjust active power as the rate of hydrogen production can only influence active power.

In general, it is difficult to determine whether overvoltage is caused by reactive or active power imbalance. Accordingly, the general practice is to adjust load so as to adjust its reactive power, where possible, and then enable active power control. Therefore, active power droop curves have much wider dead bands (i.e., $V_1$-$V_0$ or $V_2$-$V_0$) as compared to dead bands in reactive power control. If reactive power control is not possible, then only active power is adjusted when the voltage level is beyond the dead bands.

FIGS. 5A-5D graphically illustrate voltage droop control of an electrolyzer system according to other example embodiments of the present invention. The graphs 500A, 500B, 500C, 500D illustrate differing slope curves according to various embodiments.

Figure 5:
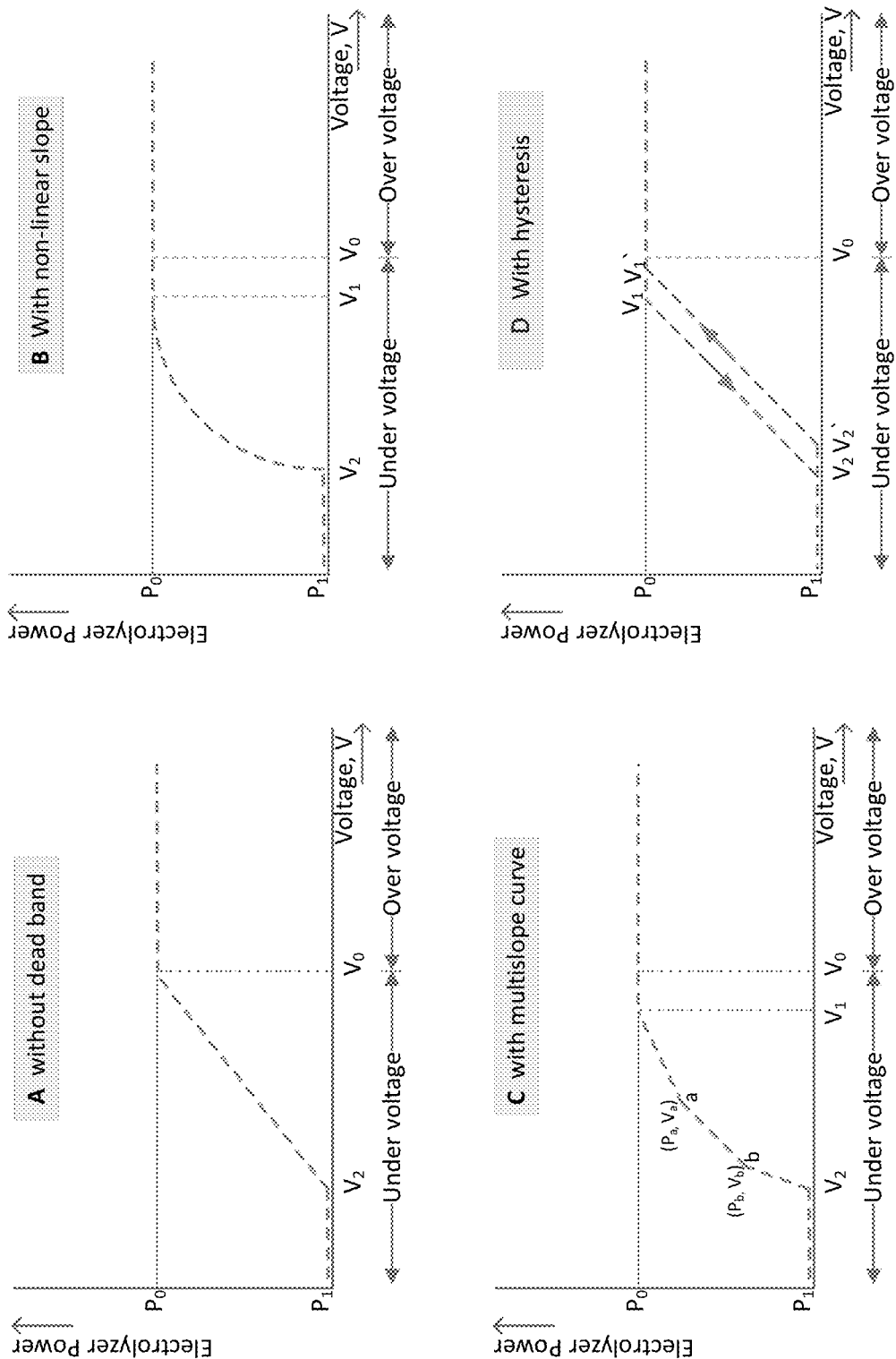
FIGS. 5A-5D graphically illustrate voltage droop control of an electrolyzer system according to other example embodiments of the present invention.

As shown in FIG. 5A, the dead band can be set to as low as zero volts. The slope of the droop curve between $V_1$ and $V_2$ can be linear as shown in FIG. 4 (or between $V_0$ and $V_2$ of FIG. 5A), or non-linear as shown in FIG. 5B. Alternatively, or additionally, the slope of the droop curve between $V_1$ and $V_2$ can have multiple slopes (e.g., linear and/or non-linear) as shown in FIG. 5C. In yet another alternative, the slope of the droop curve between $V_1$ and $V_2$ can have hysteresis as shown in FIG. 5D. The width of hysteresis ($V_1$-$V_1'$ and $V_2$-$V_2'$) and slopes between $V_1$ and $V_2$ as well as and $V_2'$ are adjustable.

In some configurations, the electrolyzer operates below its maximum possible production level for various reasons such as optimizing life expectancy, increasing reliability, etc.

Additionally, or alternatively, the electrolyzers can be configured to support overproduction (overload) for a short period of time. In such as cases, that additional production can be achieved during over voltage grid scenarios. Over voltage on the electrical power system network indicates there is excess generation available which can be consumed before generators react and reduce the generation level. The electrolyzers can be configured to consume this excess power by increasing their hydrogen production level beyond the nominal rating for short period of time while the generators begin a process of reducing power. The consumption of excess power reduces excess generation available on the network and thus mitigates over voltage levels.

Figure 6:
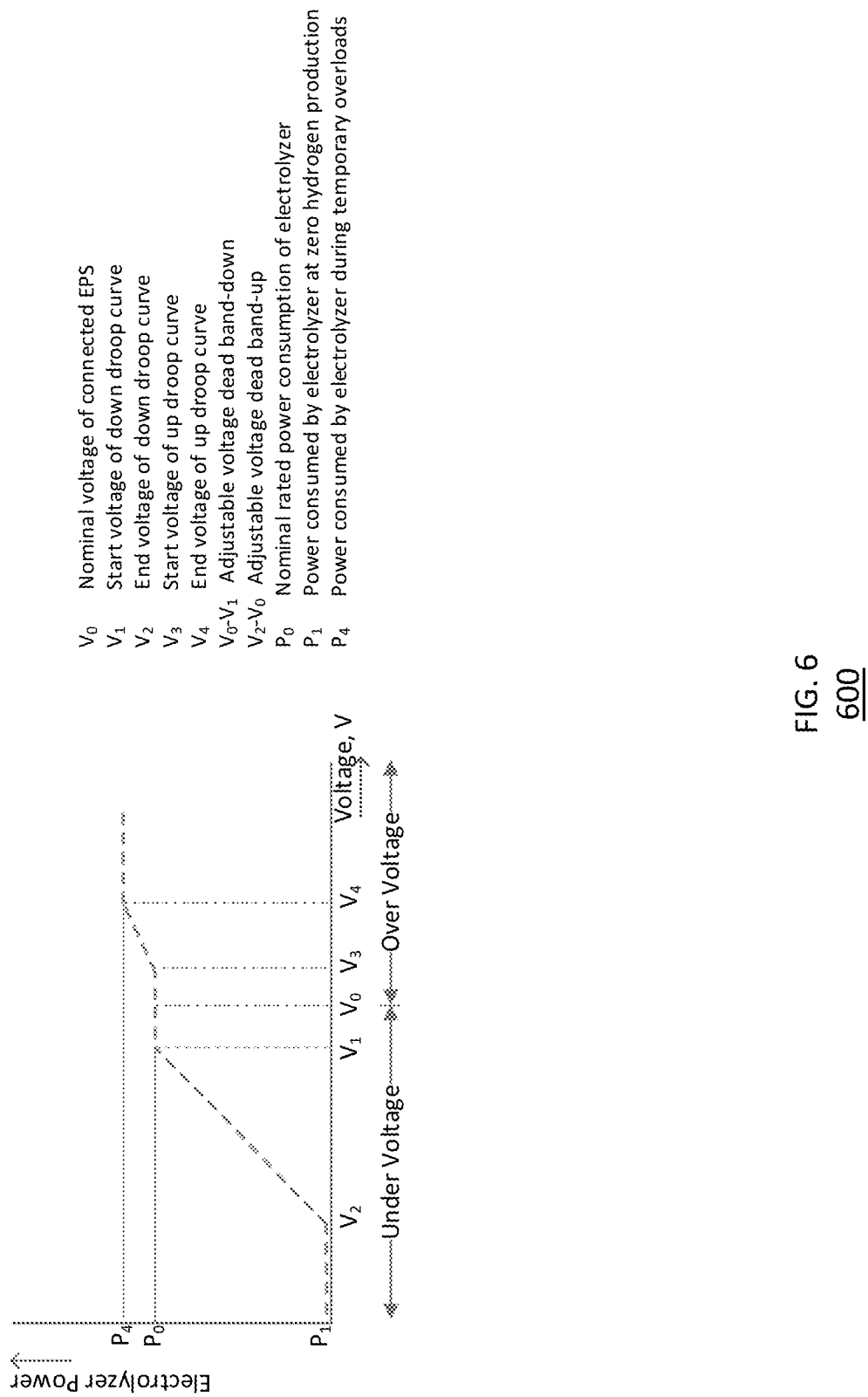
FIG. 6 graphically illustrates a voltage droop characteristic of an electrolyzer system with temporary overload according to an example embodiment of the present invention.

FIG. 6 graphically illustrates a voltage droop characteristic of an electrolyzer system with temporary overload according to an example embodiment of the present invention. The graph 600 illustrates over production level $P_4$ during temporary overloads.

At nominal voltage $V_0$, the electrolyzer system is configured to deliver rated production level $P_0$. An adjustable dead band down ($V_1$-$V_0$) at or near nominal voltage $V_0$ is used to prevent the electrolyzer from responding to small downward fluctuations in voltage and thus improve stability of the network. An adjustable dead band up ($V_0$-$V_3$) at or near nominal voltage $V_0$ is used to prevent the electrolyzer from responding to small upward fluctuations in voltage and thus improve stability of the network.

The electrolyzer starts reducing its hydrogen generation, and thus reducing power consumption from network once the voltage drops below $V_1$ level until it reaches zero hydrogen production at voltage $V_2$. When the voltage increases, the electrolyzer ramps up production according to the droop curve. The electrolyzer starts increasing its hydrogen generation, and thus increasing power consumption from network once voltage exceeds $V_3$ level until it reaches overload hydrogen production at voltage $V_4$.

In some embodiments, the voltage and frequencies of EPS network are decoupled variables that vary independently and in different directions and different magnitudes. For example, it is possible to have over frequency and under voltage at the same time and vice versa. Under these circumstances, active power control can give preference to frequency droop as compared to the voltage droop curve. In other words, the electrolyzer can be configured to enable the voltage droop only when frequency is within a frequency droop dead band. Alternatively, the electrolyzer can be configured to enable the frequency droop only when voltage is within a voltage droop dead band.

The embodiments described herein can be readily applied to a variety of electrolyzers, such as a single electrolyzer, a group of electrolyzers, or a whole electrolyzer plant; water electrolysis or splitting hydrocarbon molecules; low-temperature electrolyzers (e.g., polymer electrolyte membrane "PEM" based or alkaline based) or high-temperature electrolyzer (e.g., solid oxide electrolyzer cells "SOECs"). The embodiments can be used in combination with any electrolyzer technology or any non-critical linearly adjustable loads.

It will be apparent to those skilled in the art that various modifications and variations can be made in the grid supporting electrolyzer of the present invention without departing from the spirit or scope of the invention. Thus, it is intended that the present invention cover the modifications and variations of this invention provided they come within the scope of the appended claims and their equivalents.

What is claimed is:

1. A method for operating an electrolyzer, the method comprising:
    setting a nominal frequency or a nominal voltage of a connected electrical power system, the electrolyzer being configured to deliver a rated production level at the nominal frequency or the nominal voltage;
    adjusting an adjustable dead band down portion of a dead band independently of a dead band up portion of the dead band during operation of the electrolyzer, wherein the adjustable dead band down portion of the dead band includes the nominal frequency or the nominal voltage; and
    reducing hydrogen generation and reducing power consumption if a frequency of the power system drops below the nominal frequency or if a voltage of the power system drops below the nominal voltage.

2. The method of claim 1, wherein the dead band is zero hertz or zero volts, or the dead band has a fixed frequency range or a fixed voltage range.

3. The method of claim 1, wherein the dead band down portion of the dead band is adjusted based one or more of a schedule, environmental condition, or grid condition.

4. The method of claim 1, wherein hydrogen generation or power consumption is adjusted according to a slope of a droop curve.

5. The method of claim 4, wherein the droop curve is linear or non-linear.

6. The method of claim 4, wherein the droop curve has a plurality of slopes, each of the plurality of slopes being linear or non-linear.

7. The method of claim 1, further comprising increasing hydrogen generation and increasing power consumption if the frequency increases.

8. The method of claim 1, further comprising increasing hydrogen generation and increasing power consumption if the voltage increases.

9. The method of claim 1, wherein the electrolyzer is a solid oxide electrolyzer.

10. The method of claim 1, wherein the dead band down portion of the dead band is adjusted without adjusting the dead band up portion of the dead band.

11. A controller for operating an electrolyzer, the controller configured to execute instructions for:
    setting a nominal frequency or a nominal voltage of a connected electrical power system, the electrolyzer being configured to deliver a rated production level at the nominal frequency or the nominal voltage;
    adjusting an adjustable dead band down portion of a dead band independently of a dead band up portion of the dead band during operation of the electrolyzer, wherein the adjustable dead band down portion of the dead band includes the nominal frequency or the nominal voltage; and
    reducing hydrogen generation and reducing power consumption if a frequency of the power system drops below the nominal frequency or if a voltage of the power system drops below the nominal voltage.

12. The controller of claim 11, wherein the dead band is zero hertz or zero volts, or the dead band has a fixed frequency range or a fixed voltage range.

13. The controller of claim 11, wherein the dead band down portion of the dead band is adjusted based one or more of a schedule, environmental condition, or grid condition.

14. The controller of claim 11, wherein hydrogen generation or power consumption is adjusted according to a slope of a droop curve.

15. The controller of claim 14, wherein the droop curve is linear or non-linear.

16. The controller of claim 14, wherein the droop curve has a plurality of slopes, each of the plurality of slopes being linear or non-linear.

17. The controller of claim 11, further comprising increasing hydrogen generation and increasing power consumption if the frequency increases.

18. The controller of claim 11, further comprising increasing hydrogen generation and increasing power consumption if the voltage increases.

19. The controller of claim 11, wherein the electrolyzer is a solid oxide electrolyzer.

20. The controller of claim 11, wherein the dead band down portion of the dead band is adjusted without adjusting the dead band up portion of the dead band.

* * * * *